United States Patent [19]

Price et al.

[11] Patent Number: 4,977,399
[45] Date of Patent: Dec. 11, 1990

[54] MOBILE RADIO PAGING TEST SYSTEM

[75] Inventors: Gary A. Price, Aloha; Daniel J. Park, Beaverton; Mark R. Gehring, Portland, all of Oreg.

[73] Assignee: AT&E Corporation, San Francisco, Calif.

[21] Appl. No.: 230,201

[22] Filed: Aug. 9, 1988

[51] Int. Cl.⁵ .............................................. H04B 7/00
[52] U.S. Cl. ..................... 340/825.440; 340/825.490; 455/31; 455/67; 455/33; 379/59
[58] Field of Search ...................... 340/825.44, 825.47, 340/825.48, 825.52, 825.54, 311.1, 825.49; 455/38, 39, 33, 32, 31; 379/57, 58, 63, 64, 59; 370/94, 95, 94.1

[56] References Cited

U.S. PATENT DOCUMENTS

| | | | |
|---|---|---|---|
| 4,661,972 | 4/1987 | Kai ................................. | 340/825.44 |
| 4,713,808 | 12/1987 | Gaskill et al. ........................ | 370/94 |
| 4,758,833 | 7/1988 | Dunkerton et al. ............ | 340/825.44 |
| 4,775,997 | 10/1988 | West, Jr. et al. ...................... | 379/58 |
| 4,788,711 | 10/1988 | Nasco, Jr. .............................. | 379/63 |

Primary Examiner—Donald J. Yusko
Assistant Examiner—Dervis Magistre
Attorney, Agent, or Firm—Elmer W. Galbi

[57] ABSTRACT

In a ratio paging system of the type having digital data modulated onto radio signals transmitted from a radio station to receiving units at remote sites, a test system. The test system includes a transmitter test module coupled to a radio transmitter at the station and a test bed module located at the remote site. The transmitter test module includes a microprocessor for generating digital test data, and a modulator coupled to the microprocessor for modulating the test data onto a radio signal and for injecting the radio signal into the station transmitter. The test bed includes a receiver for receiving the modulated radio signal, a demodulator for demodulating the received radio signal to recover the digital test data, and a computer for processing the recovered digital test data to generate paging test information. The mobile test bed also includes means for determining the latitude and longitude of a site to generate digital location data which is used to generate test information. The test system further includes a mobile vehicle for transporting the test bed, a power supply in the vehicle for providing power to the test bed, and means for determining the distance travelled by the vehicle to provide a test sampling rate. The test bed and the transmitter test module may communicate using a cellular phone ystem for transmitting and receiving coded dial tones. The coded dial tones correspond to predetermined digital test data patterns and other test information.

10 Claims, 2 Drawing Sheets

MOBILE RADIO PAGING TEST SYSTEM

This invention relates to a system for testing a radio paging system and, in particular, relates to a transmitter test module and a mobile test bed which generate error, message completion, range, and similar paging test information for a number of transmitting radio stations and for a variety of test sites.

BACKGROUND OF THE INVENTION

Paging systems are commonly used to send messages from one location to another. In these systems, a pager requester at one location pages a receiving user at another remote site. The pager requester typically initiates a pager request using a common Dual Tone Multi Frequency (DTMF) telephone. The pager requests are then provided to communication lines and finally transmitted, for example, as part of an FM signal from an FM radio station to the receiving user. The paged individual uses a paging receiver to receive and decode the FM signal to extract the message. The paging receiver may be carried for example, in a watchlike device.

A variety of radio paging systems are in common use. One such system, described in Gaskill et al. U.S. Pat. No. 4,713,808, teaches the modulation of an FM subcarrier signal with packets of digital data. This signal is injected into a conventional exciter and then transmitted from the FM station to a plurality of paging receivers. This patent is incorporated herein by reference and made a part of this application.

One problem encountered by paging companies is the need to determine in advance the range and quality of radio paging signals that will be received at various sites from a particular transmitting radio station. It is extremely desirable to have such information before a financial commitment is made to enter a lease or other arrangement with the station. These companies also need to determine the quality of the paging signal that will be received at various sites in view of various environmental obstacles such as buildings mountains, and the like.

Similar information is also extremely useful in trouble shooting, for example in determining whether erroneous pager transmissions are the fault of the paging company or transmission equipment at the radio station.

Such paging test information is typically determined only after an actual paging system is installed at the FM station and radio paging signals have been transmitted to pager customers. This method is an ad hoc process and can lead to a commitment to stations which are not suitable for paging because of poor transmission characteristics or environmental obstacles. Unnecessary customer dissatisfaction with the quality of received pager requests is also a possible result.

Moreover the use of an actual on-line paging system for testing is also limited by the difficulty for an actual pager to initiate a range of tests (a) in a matter of seconds, (b) at a variety of locations (c) for several candidate stations simultaneously, and (d) under varying environmental conditions.

Further, the use of normal paging frequencies for testing could interfere with or complicate normal paging operations.

SUMMARY OF THE INVENTION

The invention comprises a test system for a radio paging system of the type using digital data modulated onto radio signals transmitted from a radio station to pager receivers at remote sites.

The test system includes a transmitter test module coupled to a radio transmitter at the station and a test bed module located at the remote site.

The transmitter test module includes a microprocessor for generating digital test data and a modulator coupled to the microprocessor for modulating the test data onto a radio signal and for injecting the radio signal into the station transmitter.

The test bed includes means for receiving the modulated radio signal, a demodulator for demodulating the received radio signal to recover the digital test data, and a computer which processes the recovered digital test data to generate paging test information. The test bed also include means for determining the latitude and longitude of a site to generate digital location data which is used to generate the test information.

The test system further includes a mobile vehicle for transporting the test bed, a power supply in the vehicle for providing power to the test bed, and means for determining the distance travelled by the vehicle to provide a test sampling rate.

The test bed and the transmitter test module may communicate using a cellular phone system to transmit and receive coded dial tones. The coded dial tones correspond to predetermined digital test data patterns and communication information.

In one embodiment of the invention, the test system is used with a paging system of the type having digital test data packets modulated onto an FM subcarrier signal. The digital test data packets may be determined by the coded dial tones communicated over the earlier mentioned cellular phone system.

In one embodiment, the test system employs a plurality of transmitter test modules in operation at a number of radio stations. In this test system, the receiver in the test bed is a frequency agile receiver for receiving the radio signals from the stations under the control of the computer. The test system rapidly and virtually simultaneously generates paging test information for a number of stations.

In one embodiment, the means for determining latitude and longitude includes a LORAN antenna and receiver.

The foregoing and additional objects features and advantages of the present invention will be more readily apparent from the following description of the drawings and the appended claims.

DETAILED DESCRIPTION OF THE DRAWINGS

The invention will now be explained first by reference to FIG. 1 which shows a test system according to one embodiment of the invention. The test system includes a transmitter test module located at a transmitting radio station and a mobile test bed located at a receiving site. One embodiment of a transmitter test module will be explained by reference to FIG. 2. One embodiment of a mobile test bed will be explained by reference to FIG. 3.

Although the invention will be explained by reference to the FM paging system described in the patent to Gaskill, incorporated herein by reference, it should be understood that test systems useful with other radio paging systems are within the scope of the invention.

Figure 1:
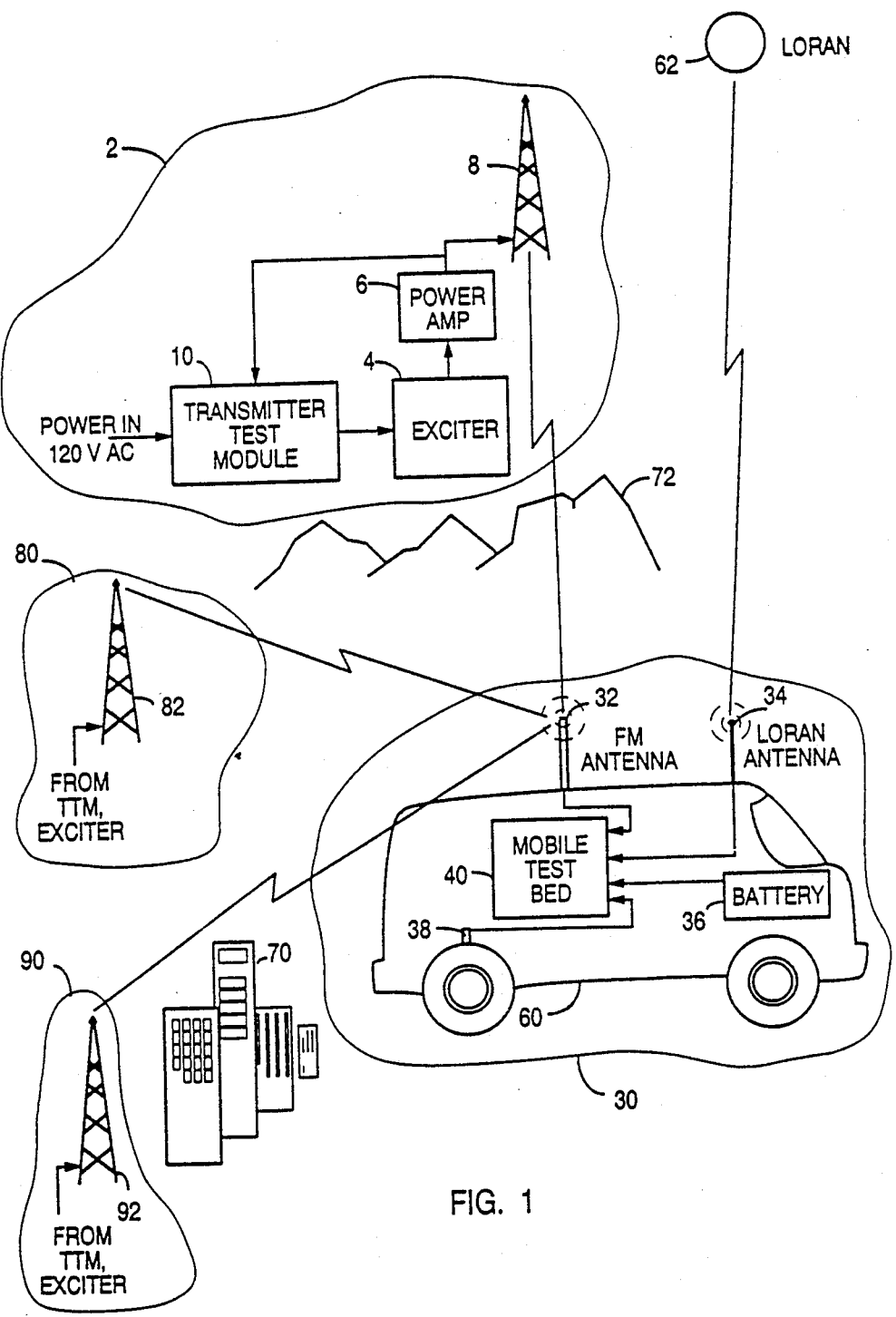
FIG. 1 is an illustration of a test system for a plurality of radio paging stations according to one embodiment of the invention.

Refer now to FIG. 1. FIG. 1 shows a test system including a transmitter test module 10 at a radio station 2 and a mobile test bed 40 at a remote site 30. Transmitter test module 10 is a portable modular unit that is powered by a 120 volt AC outlet at the radio station. The transmitter test module in this embodiment modulates digital data onto an FM subcarrier signal.

The modulated FM subcarrier signal is injected into exciter 4. An FM signal from exciter 4 is passed to power amp 6 which amplifies the FM signal to the proper radio transmission level. An output of power amp 6 is fed back to transmitter test module 10. The FM signal output of power amp 6 is also coupled to radio transmission antenna 8 for broadcasting to a number of remote sites.

One of the remote sites for receiving the broadcast FM radio signal is site 30. Under normal paging operations, a pager receiver could be located at site 30. According to the invention, a mobile test bed 40 is located at site 30 for generating test information indicative of the quality of the radio paging system for station 2 and site 30.

The mobile test bed 40 receives the modulated radio paging signal over FM antenna 32. FM antenna 32 is coupled to an input to the mobile test bed.

The mobile test bed is powered by a power source at site 30. Where the mobile test bed is located at a building or similar site, a normal 120 volt AC power hook-up can be used. For the embodiment shown in FIG. 1 where the mobile test bed is located in a van 60, power 36 is ultimately drawn from the van battery 36 through DC to AC power inverters.

A LORAN antenna 34 may also be coupled to another input to mobile test bed 40. The LORAN antenna is used to received latitude and longitude data from a LORAN transmitter 62 and feeds a LORAN receiver (not shown) in test bed 40.

A set of magnets 38 may also be coupled to the drive train of van 60 to provide a signal which indicates the distance travelled by van 60. This signal is also coupled to an input to mobile test bed 40.

The test setup shown in FIG. 1 may also include a plurality of other transmitter test modules like transmitter test module 10. These other transmitter test modules would be located at a number of other radio stations represented by stations 80 and 90. These other transmitter test modules would also cause modulated radio paging signals to be transmitted from antenna 82 at station 80 and from antenna 92 at station 90 simultaneously with the transmission of the modulated radio paging signal from antenna 8 at station 2. A plurality of radio signals can thus be simultaneously received by FM antenna 32 and provided to mobile test bed 40 at site 30.

Also shown in FIG. 1 are examples of environmental obstacles, such as buildings 70 and mountains 72. One purpose of the test setup according to the invention is to determine how well stations 2. 80 and 90 complement each other to provide optimum reception at van 60 as van 60 travels through a number of sites.

Figure 2:
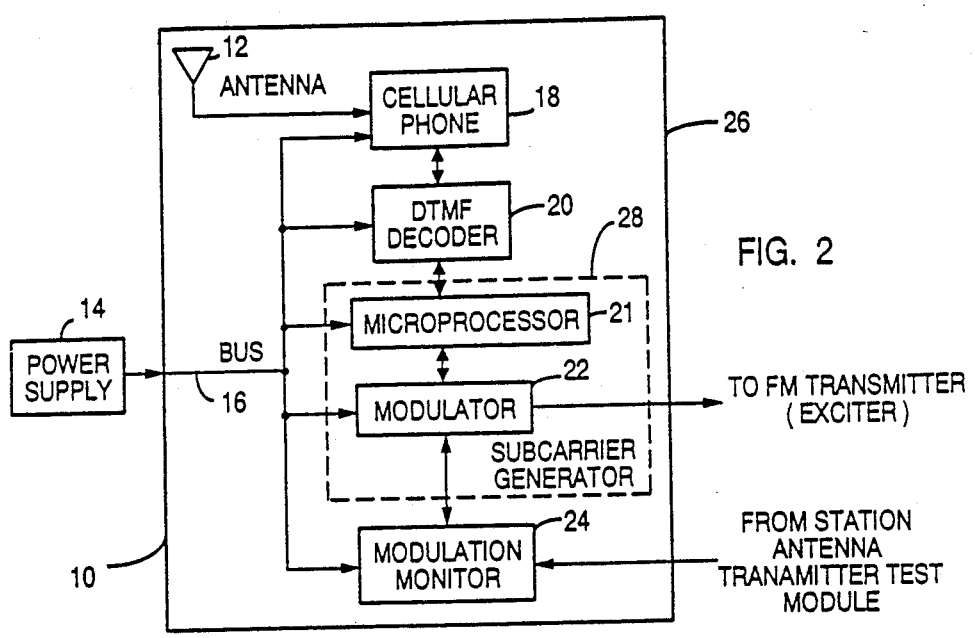
FIG. 2 is a block diagram of a transmitter test module according to one embodiment of the invention.

FIG. 2, which shows a transmitter test module according to one embodiment of the invention will now be discussed to provide a further understanding of the invention.

Transmitter test module 10 is a portable unit and may be housed in a modular-type case 20.

Transmitter test module 10 requires only three inputs and outputs total. The inputs to transmitter test module 10 are from a power supply 14 and a feedback signal from the station antenna. The transmitter test module 10 provides an output to an exciter of an FM transmitter.

The embodiment shown in FIG. 2 includes an antenna 12 for receiving a test control signal from a remote site (not shown). Antenna 12 is coupled to a cellular phone 18 and may be a standard antenna provided with a cellular phone system.

The output of cellular phone system 18 is coupled to a dual tone multi frequency (DTMF) decoder 20. DTMF decoder 20 decodes the tones received by cellular phone 18 to provide digital data at its output. The digital data from DTMF decoder 20 is coupled to an input to subcarrier generator 28.

Subcarrier generator 28 includes a microprocessor 21 and a modulator 22.

Microprocessor 21 receives the digital data output from DTMF decoder 20 and generates predetermined digital test data packets corresponding to the decoded dial tones. These test data packets may be, for example, random data or all 1's or some known predetermined combinations of 1's and 0's. The test data packets may, but need not, correspond to the data packets that would be used were an actual paging request being transmitted.

The DTMF decoder 20 and microprocessor 21 may perform similarly to the queuer or modem 40 in U.S. Pat. No. 4,713,808, discussed in column 33, line 25 et seq.

Modulator 22 accepts a 19 kHz baseband signal from modulation monitor 24 and provides a corresponding phase locked 66.5 kHz subcarrier to the exciter (not shown) in phase with the station 19.0 kHz stereo pilot signal Modulator 22 also supplies a 19 kHz reference clock signal having a fixed phase relationship to the stereo pilot signal to microprocessor 21. Modulator 22 provides an output signal that meets the radio system limitations imposed on the modulator described in Gaskill U.S. Pat. No. 4,713,808.

The exciter receives the modulated FM subcarrier from subcarrier generator 28 and receives a stereo audio and stereo pilot signal from a conventional stereo modulator circuit at the radio station. The exciter generates a low level RF signal including these component signals and provides these to a power amplifier. The power amplifier supplies the amplified RF signals to an FM transmitting antenna for broadcast.

Modulation monitor 24 is fed back the FM radio signal as input and outputs a composite stereo base band signal that includes both audio modulation, stereo pilot, and subcarrier signals.

Power supply 14 in FIG. 2 provides power to cellular phone 18, DTMF decoder 20 microprocessor 21. modulator 22, and modulation monitor 24 over a power bus 16.

Power supply 14 may be, for example, a conventional 120 volt AC supply at the radio station.

All of the foregoing components of the transmitter test module, except for the DTMF decoder and the subcarrier generator are off-the-shelf components.

Cellular phone 18 and antenna 12 may be an off-the-shelf cellular phone system for example, NEC Model M3500.

The DTMF decoder is a printed circuit board that includes a conventional DTMF decoder and additional circuitry for communicating with the cellular phone and the SCA generator. The commercial DTMF decoder may be, for example, chip #M8870, manufactured by Mitel.

Microprocessor 21 is a conventional programmable integrated circuit such as a conventional model #HP63705 processor provided by Hitachi, Inc.. and includes a conventional microprocessor chip and PROM arrangement.

Modulator 22 may be a modulator as used during radio paging for the system described in U.S. Pat. No. 4,713,808, column 32, et seq.

Modulation monitor 24 may be, for example, a modulation monitor as described in U.S. Pat. No. 4,713,808.

Although the transmitter test module has been discussed with respect to the embodiment in FIG. 2, it should be understood that modifications, simplifications, or changes can be made to this embodiment within the scope of the invention. For example, the microprocessor could be programmed to generate predetermined test data packets starting at a certain time once a test button on the transmitter test module is activated or at the direction of an internally or externally supplied timing signal. Such a configuration could be used, for example, where it is not essential for the transmitter test module and the test bed to be in direct communication.

It should also be understood that microprocessor 21 and/or DTMF decoder 20 may be replaced by a decoder/encoder combination or other such devices of varying sophistication which generate predetermined data packets as output given a simple digital, analog, or audio input.

Having discussed an embodiment for a transmitter test module 10 and the transmission of a radio paging signal from a station an embodiment for a mobile test bed will now be discussed by reference to FIG. 3.

Figure 3:
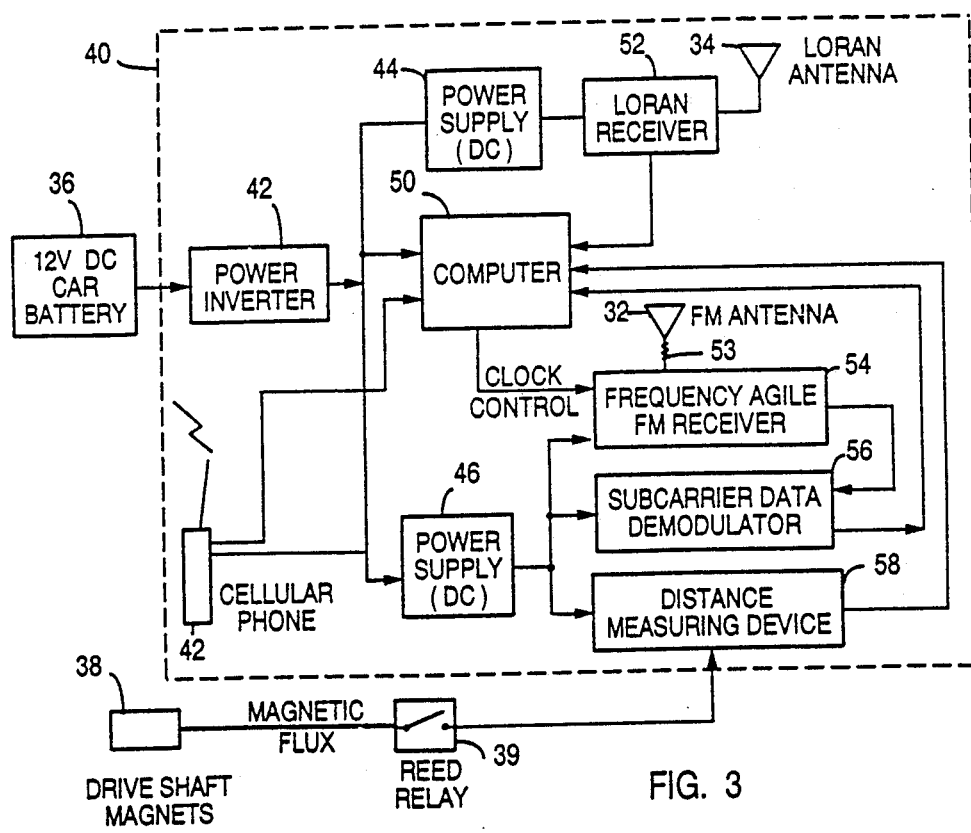
FIG. 3 is a block diagram of a test bed according to one embodiment of the invention.

FIG. 3 shows a mobile test bed 40 for generating paging test information. The mobile test bed 40 includes an FM antenna 32 for receiving a modulated radio signal transmitted from a radio station (not shown).

The output of the FM antenna 32 is coupled through an attenuator 53 to a frequency agile FM receiver 54. The output of frequency agile FM receiver 54 is coupled to a subcarrier data demodulator 56. The subcarrier data demodulator demodulates the modulated subcarrier and recovers the digital test data packets modulated onto the subcarrier signal by the subcarrier generator in the transmitter test module.

The subcarrier data demodulator 56 provides recovered digital test data packets to a computer 50. Computer 50 may also have the original digital test data packets stored in memory, or generated using an algorithm given inputs from a keyboard or a communication link to cellular phone 42. Computer 50 stores and/or processes the recovered digital test data packets to generate desired test information.

The mobile test bed may also include components for determining the location of site 30. In the embodiment shown in FIG. 3 these components include a LORAN antenna 34 for receiving latitude and longitude information from a LORAN transmitter. The output from the LORAN antenna is coupled to a LORAN receiver 52.

The LORAN receiver 52 generates digital location data that is coupled to an input to computer 50. Computer 50 stores and/or processes the location data for generating test information.

The embodiment according to FIG. 3 also includes components for determining the distance travelled by the mobile test bed 40. These components include magnets 38 that are attached to the drive train of a van (not shown) in which the mobile test bed 40 may be carried. The magnets 38 are coupled to an input side of reed relay 39. Reed relay 39 is closed every time the drive train (drive shaft) completes half of a rotation. This closure indicates that the van has travelled a predetermined distance (e.g. 11.3 inches) which corresponds to a desired sampling distance.

The output of reed relay 39 is a digital (on/off) signal that is coupled to an input of a distance measuring device 58. Distance measuring device 58 provides digital data output that indicates the distance travelled. This output is provided to an input of computer 50. Computer 50 may store and/or process the distance data for generating test information.

When the mobile test bed 40 is used at a remote site having a normal 120 volt power supply test bed 40 can be configured to use this normal power supply. However, where test bed 40 is transported in a vehicle, the test bed 40 is required to use a special power supply system such as that shown in FIG. 3. This power supply system includes a 12 volt DC car battery 36 that is coupled to a power inverter 42 to provide a 120 volt AC output. This 120 volt AC output is used to power computer 50 and is also provided to AC to DC power supplies 44 and 46.

Power supply 44 provides 15 volts DC to LORAN receiver 52. Power supply 46 provides ±12 volts DC to the frequency agile FM receiver 54, and ±5 volts DC to subcarrier data demodulator 56 and to the distance measuring device 58.

The mobile test bed 40 in FIG. 3 also includes a cellular phone system 42 which provides test control signals to the transmitter test module located at the radio station.

Although a cellular phone system is shown, it should be understood that other portable or fixed devices for communicating with the transmitter test module may be used within the scope of the invention. In addition, cellular phone 42 may include an output that is coupled to an input to computer 50 for immediately providing computer 50 with the test control information being sent to the transmitter test module.

As earlier mentioned, in some situations the test system may be configured such that the transmitter test module generates known test data packets without communicating with the mobile test bed. For these situations and others it should be understood that computer 50 may be humanly programmed with the test control information or test data either in advance or at the time of the test.

The mobile test bed may be assembled using off-the-shelf components.

Computer 50 may be, for example a commercially available personal computer or a lap top computer for example, a Compaq 8086 or any IBM compatible PC.

Car battery 36 is a normal 12 volt DC car battery. Power inverter 42 may be, for example, a PV-1000FC power inverter from Tripp-Lite, Inc. Power supplies 44 and 46 may be commercially available power supplies, such as Model TP5-4000 from Topward Electric Instruments.

The LORAN antenna 34 and the LORAN receiver 52 may be commercially available LORAN antennas and receivers, such as an 8' Shakespeare Tuned Antenna and Model 8002 vended by King Corporation and available at most airports.

The attenuator may be a conventional attenuator that is adjustable by setting a series of dials or knobs. Frequency agile FM receiver 54 is custom made by AT&E. Conventional interface circuitry must be added to a conventional receiver using ordinary skill in the art in view of the invention so that it can be tuned to selected frequencies under the control of computer 50.

Subcarrier data demodulator 56 was custom made by AT&E using ordinary skill in the art in view of the invention.

The distance measuring device 58 is an off-the-shelf item, consisting of an Archer Magnetic Contact Switch and No. 812 Neill Magnets.

Having described a paging test system having a transmitter test module and a mobile test bed according to various embodiments of the invention by reference to FIG. 1, FIG. 2, and FIG. 3, the normal operation of the invention will now be explained for the embodiments in FIGS. 1-3 when used to test a paging system as described in U.S. Pat. No. 4,713,808.

Having described the transmitter test module and the mobile test bed, the operation of the test system will now be discussed.

When a particular radio station is to be tested, a transmitter test module must first be installed at the station. The transmitter test module can be a portable box-like device that is easily and rapidly installed at the radio station.

The transmitter test module has three hook-ups that must be connected: (1) to the exciter to inject the modulated subcarrier signal: (2) to the power amplifier at the station to provide a stereo pilot signal for locking the subcarrier signal to the transmitted FM signal: and (3) to a station 120 volt AC power outlet.

The cellular telephone antenna at the radio station is next erected to facilitate reception from the mobile test phone.

The mobile test bed is then transported throughout the areas under test.

Next, the cellular telephone in the mobile test bed is used to call up the cellular telephone located at the radio station. The antenna for the cellular telephone at the mobile test bed is located in the portable cellular phone handset.

After receiving an acknowledge signal back from the cellular phone at the transmitter test module, the cellular phone at the mobile test bed communicates test control information to the transmitter test module. This information may be in the form of a single or multiple dial tones, for example, a "1", "12", "7", or some other digit or series of digits on the key pad of the cellular phone.

These control tones are then transmitted over a cellular phone communication system to the cellular phone at the radio station to cause modulation of a particular digital test data packet onto a test FM subcarrier signal. For example each digit, 0-9, or combination of digits, may be used to represent one of ten possible digital test data packets.

As an example a "60" punched at the test bed cellular phone may be used to generate a (known) random data pattern. An "11" may cause generation of an all "1" test data packet.

A random data pattern may be used, for example because it corresponds most closely to the real data pattern used in an actual paging mode. On the other hand, if the purpose of the test is to perform a simple multi-path or range analysis, an all 1's pattern has been found to be sufficient.

Certain digits can also be used as a code for certain communication functions at the transmitter test modules. For example "#" represents hang up whereas, "*" causes the controller to return to its main menu of options. It should be understood that any number of combinations of data patterns can be generated so long as the transmitter test module can correlate a received tone to a predetermined digital test data pattern and/or communication function.

A tone may be generated by the processor to indicate a valid entry or an error. The tone generator is located on the DTMF decoder board. This tone may then be retransmitted over the cellular phone system back to the cellular phone at the mobile test bed. This return tone feature may be included as a means for the mobile test bed to verify that the control tones were properly received at the transmitter test module.

It is also possible to return phase information to the mobile test bed from the transmitter test module using this echo feature. For example, the relative phase between the transmitted 66.5 kHz subcarrier and the 19 kHz stereo pilot signal may be returned. This information may be used to record any phase discrepancies caused by the transmitting equipment.

Once the cellular telephone receives the tones, this information is passed to a DTMF decoder. The DTMF decoder generates digital data output from the input tones. This digital data output may be up to four bits and is passed to the subcarrier generator over a four-bit bus.

These bits are provided to the microprocessor which reads the input data and generates a digital test data packet under program control. The microprocessor also generates two tones which are coupled back to the cellular phone system for transmission back to the cellular phone at the mobile test bed. These two tones are used, for example, for acknowledge and to indicate an error in the received tones.

Meanwhile, the modulation monitor receives the station FM signal at full RF from the transmission line. This FM signal is a typical FM signal between 88–108 mHz, and is demodulated down to audio and provided to the subcarrier generator (modulator) as base band. The modulation monitor provides an audio signal from 0-100 kHz to the modulator.

The modulator uses the base band to extract the 19 kHz stereo pilot tone which is used to generate a modulated 66.5 kHz subcarrier. The subcarrier generator uses AMPSK duo binary modulation.

The modulated subcarrier is injected into the exciter and is subsequently broadcast by the station transmitter.

The modulation monitor also measures the subcarrier injection level, which is set in this case at 10 percent. The modulation monitor includes a display so that a technician at the radio station may look at the modulation monitor and readily determine the injection level into the exciter. By quickly scanning the display, a technician at the station can determine that the transmitter test module is injecting at a proper level and, thus, is not the source of any problems arising at the station.

Next, the computer at the test bed is placed in a test mode.

The known test control tones or packets can be entered either by communicating the original DTMF tones to the computer or by interfacing a human programmer.

Next, the transmitted signal is received by a monopole FM antenna at the mobile test bed. This monopole antenna is conveniently mounted on the top of the roof of a field test van in some embodiments.

The signal is then attenuated by an attenuator to reduce the signal level to that which could be expected when the signal is received via an antenna, for example, in a watch type pager. The other components of the mobile test bed may also simulate the performance characteristics for similar components of a pager watch or other unique pager receiver (e.g. vehicle portable adjustable length etc.).

The frequency agile receiver receives the modulated signal from the attenuator. Under control from the computer, the frequency agile receiver tunes to a different station once every 100 milliseconds. The frequency agile FM receiver demodulates the radio frequency and generates output audio between 0-100 kHz.

This base band output from the frequency agile receiver is input into the subcarrier data demodulator. The subcarrier data demodulator demodulates the base band to recover the digital test data packets. The subcarrier data demodulator produces a 19 kHz clock signal and 19 kHz test data.

The clock information and the recovered data packets are fed into the computer.

As the vehicle moves, magnets on the drive shaft open and close a reed relay whenever the magnets rotate pass the reed relay, for example, every 11.3 inches. The reed relay provides an input signal to the distance measuring device which in turn generates a digital distance data output signal. This digital distance signal is stored and/or processed by the test computer. The data packets may thus be sampled with respect to distance rather than with respect to TIME.

Simultaneously, the LORAN antenna and receiver may receive latitude and longitude information from a set of LORAN transmitters and output digital location data. This digital location data is also provided to the computer for storing and/or processing. The recovered data packet will correspond to the test data packet modulated onto the subcarrier by the transmitter test module absent error, faulty transmission environmental obstacles, multi path problems, etc.

The computer may simply store the recovered data packet in memory or floppy for later processing by the computer or at a central computer facility.

The computer may also fully process the data packets by comparing the known data patterns to the data pattern recovered by the subcarrier data demodulator. The computer thus generates test information which indicates, for example, the message completion rate for a particular area.

Delays, distortion, and receipt of data along multiple paths all contribute to a lack of correlation between the test data generated by the microprocessor and the recovered data patterns. These irregularities appear as noise which the subcarrier data demodulator is not able to properly demodulate.

When the test receive site is located outside the range of the radio station, the subcarrier data demodulator will recover meaningless data patterns.

When the received radio signal fades in and out, the recovered data patterns will correlate for sequences and then meaningless data will appear for the periods of fade.

By comparing the expected data with the recovered data, the test system provides a means for evaluating the message completion rate for a paging system. Thus, it is possible to determine how many packets were received error free, how many packets would have been capable of correction by error correcting features in the paging system, and how many packets were incapable of correction. The test system may evaluate the probability of error correction by employing the same error correction algorithms on the recovered data as would have been employed by the protocols in the pager receiver system.

The invention provides a means for evaluating the performance of radio transmitters to determine if the transmitters are suitable for pager reception at a variety of locations. The test information may indicate, for example, if the radio station has a bad transmitter, bad location or is affected by environmental obstacles.

The system also provides a dependable means for determining if the cause of trouble in a radio paging system is in the radio transmitter or the paging system.

The test system also provides a means for determining how well a plurality of stations complement each other in a radio paging system.

The test system may also be used to test the effect of different modifications, variations and changes on the quality of a radio paging system, such as a change in a modulation scheme or an error correction algorithm. The invention can also uncover such information as the number of times a message needs to be repeated for optimum reception or the area that should be claimed by the paging company as a coverage area.

The test system may also be used for an FM station analysis prior to lease negotiations.

The test system is extremely flexible and can be adapted to simulate a variety of pager devices (e.g. pager watch, car pager) at the mobile test bed.

Having described and illustrated the principles of our invention and various embodiments, it should be apparent to those skilled in the art that the other changes and modifications in arrangement and detail can be made within the scope and spirit of the invention.

For example, it is possible to augment the system by entering environmental information such as the presence of rain, temperature, a nearby building or mountain, or other such conditions at the time and location the tests are being made. This information could be used by the microprocessor to generate a preferred test data packet or simply entered as a comment line with the data stored or processed by the test bed computer.

Further, it can be seen that in its broadest aspect, the invention is a test system useful with any radio data delivery system.

Thus, it should be understood that the invention is limited only by the appended claims.

What is claimed is:

1. In a paging system of the type having digital data modulated onto a radio signal to communicate a pager request, said radio signal transmitted from a radio station by a transmitter to a pager receiver located at a site remote from said station, a test system comprising:
   a transmitter test module coupled to a radio transmitter at said station and a test bed located at said remote site, said transmitter test module including:

a microprocessor for generating digital test data;

means coupled to said microprocessor for modulating said digital test data onto a radio signal and for injecting said modulated radio signal into said station transmitter;

said test bed including:

an antenna and a receiver for receiving said modulated ratio signal;

means coupled to said receiver for demodulating said modulated radio signal to recover said digital test data;

a computer coupled to said demodulator, said computer processing said recovered digital test data to regenerate paging test information; and means for determining the latitude and longitude of said site to generate digital location data, said computer coupled to said means for determining location for processing said digital location data to generate said test information.

2. The invention of claim 1 and wherein said transmitter test module and said test bed are portable modules.

3. The invention of claim 1 further comprising:

a mobile vehicle for transporting said test bed; and a power supply on said vehicle for providing power to said test bed.

4. The invention of claim 3, further comprising:

means coupled to said vehicle for measuring the distance travelled by said vehicle to generate digital distance data, said computer means coupled to said distance measuring means for generating test information at a sampling rate determined by said digital distance data.

5. The invention of claim 4 and wherein said test bed further includes:

means for determining the latitude and longitude of said site to generate digital location data; and wherein said computer is coupled to said location determining means for processing said digital location data to generate said paging test information.

6. The invention of claim 5 and wherein said means for determining location includes a LORAN antenna and receiver.

7. In a paging system of the type having digital data modulated onto a radio signal, said radio signal transmitted from a radio transmitter at a radio station to a power receiver located at a remote site, a test system comprising:

a test bed located at a remote site and a transmitter test module located at said radio station;

said test bed including:

a first cellular phone system for communicating a plurality of coded dial tones to said radio station;

said transmitter test module including:

a second cellular phone system for receiving said coded dial tones;

a tone decoder and a microprocessor combination coupled to said second cellular phone system for decoding said coded dial tones to generate a plurality of digital test data patterns, each corresponding to one of said coded dial tones;

means coupled to said microprocessor for modulating a test subcarrier signal with said digital test data patterns and for injecting said modulated subcarrier signal into said radio transmitter;

said test bed further including:

an antenna and a receiver for receiving said modulated signal;

means for demodulating said received signal to recover said digital test data patterns;

computer means coupled to said demodulator for processing said recovered digital test data patterns to generate test information;

a mobile vehicle for transporting said test bed; and a power supply on said vehicle for providing power to said test bed.

8. The invention of claim 7, further comprising:

means coupled to said vehicle for measuring the distance travelled by said vehicle to generate digital distance data, said computer coupled to said distance measuring means for generating test data at a sampling rate determined by said digital distance data.

9. The invention of claim 8 and wherein said means coupled to said vehicle for measuring the distance travelled by said vehicle includes a magnet coupled to the drive train of said vehicle and a reed relay coupled to said magnet for generating a signal each fixed distance segment traveled.

10. In a paging system of the type having digital data modulated onto a radio signal to communicate a pager request, said radio signal transmitted from a radio station by a transmitter to a pager receiver located at a site remote from said station, a method for testing said system comprising:

generating digital test data at said station;

modulating said digital test data onto a radio signal;

injecting said modulated radio signal into said station transmitter;

transmitting said modulated radio signal;

receiving said modulated radio signal at a test location;

demodulating said modulated radio signal to recover said digital test data;

processing said recovered digital test data to generate paging test information;

determining the latitude and longitude of said test location to generate digital location data; and processing said digital location data to generate said test information.

* * * * *